Jan. 29, 1957 D. S. CAMPBELL 2,779,121
FISHLINE BOB OR FLOAT
Filed Jan. 6, 1956
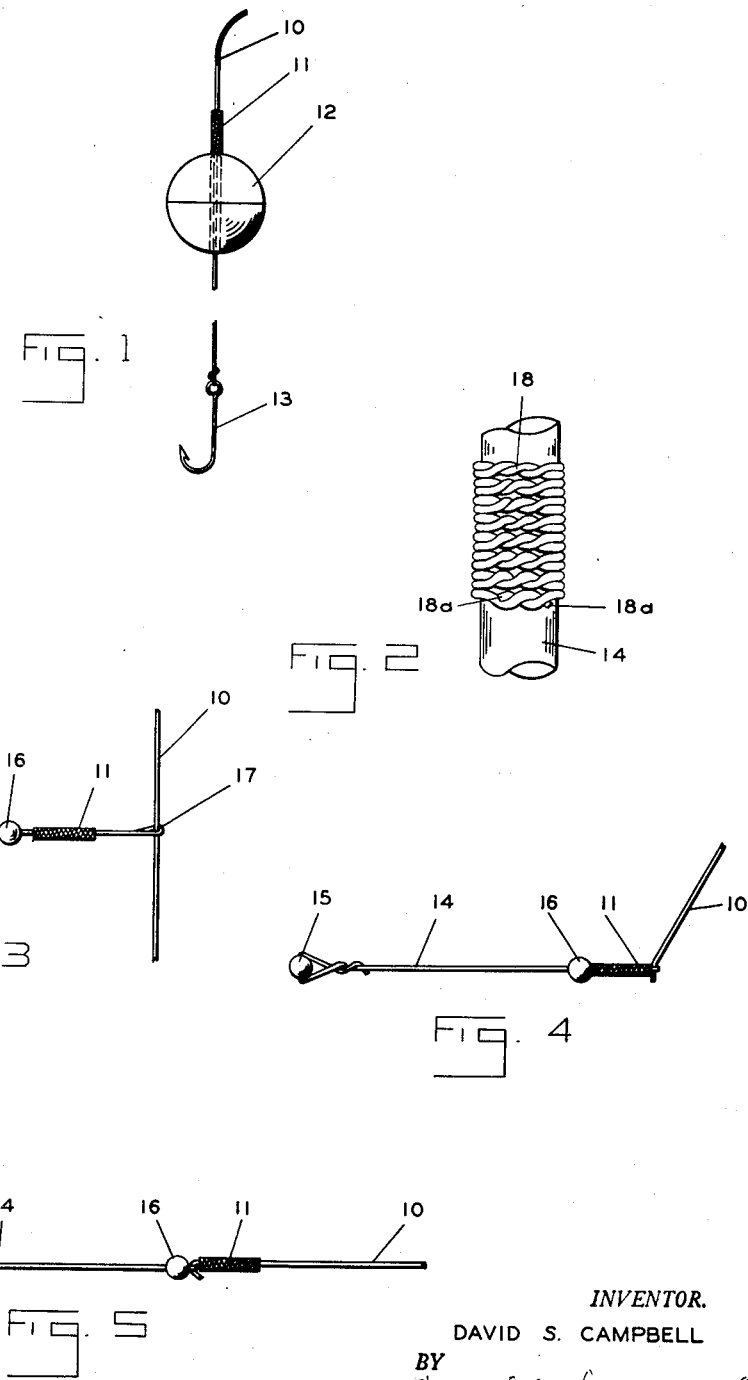
INVENTOR.
DAVID S. CAMPBELL
BY
ATTORNEYS United States Patent Office 2,779,121
Patented Jan. 29, 1957

2,779,121

FISHLINE BOB OR FLOAT

David S. Campbell, Columbus, Ohio

Application January 6, 1956, Serial No. 557,704

2 Claims. (Cl. 43—43.15)

My invention relates to a fish line bob or float. It has to do, more specifically, with a float which is mounted on the line or leader between the hook and a stop so that the line with the bob thereon can be used in casting. With this arrangement the float is positioned adjacent the hook during casting and as the hook sinks in the water, the float or bob will move up on the line into contact with the stop thereby locating the hook at a predetermined depth.

This general arrangement has been provided in the past. However, the stop in the line or leader for predetermining the depth of the hook has been made merely by tying a knot in the line or leader. Obviously, when the knot is once tied, the position of the float can not be varied to vary the depth of the hook without untying the knot or cutting off a portion of the leader or line and tying the knot in a different place.

It is the main object of this invention to provide a stop arrangement for predetermining the position of the bob or float in which a stop member is provided that is adjustable on the line to vary the position of the bob or float and which is of such a nature that it can remain on the line for other types of fishing when the bob is not used.

In the accompanying drawing, I have illustrated an example of my invention. In this drawing:

Figure 1 is an elevational view illustrating the stop on the line to limit the uppermost position of the bob or float.

Figure 2 is a view illustrating how the stop sleeve for the line may be formed.

Figure 3 is a view illustrating the use of a threader in positioning the stop sleeve on the line or leader, the first step being shown.

Figure 4 is a similar view illustrating the second step in transferring the stop sleeve from the threader to the line.

Figure 5 is a similar view illustrating the stop sleeve moved onto the line.

With reference to the drawing, in Figure 1 I have illustrated the line or leader 10, the stop sleeve 11, the bob 12 and the hook 13. The bob 12 is positioned between the stop sleeve 11 and the hook 13 and is freely slidable on the line between such members.

With this arrangement, it is obvious that when casting the bob 12 can be positioned at the end of the line adjacent the hook. The sleeve 11 is relatively small in diameter and can pass through the guide on the reel. After casting into the water, the hook will sink and the bob 12 will move up until it contacts the stop sleeve 11. The stop sleeve 11 resiliently grips the line or leader so that it is held in position thereon with sufficient firmness to resist upward movement of the bob 12 on the line, that is, it is sufficient to resist the upward movement on the line which the weight of the hook 13 tends to create. However, the stop sleeve can be moved along the line by pressure exerted by the fingers.

The line 10 may be of the monofilament nylon type which has been heat-treated to set it so that it will not stretch. The sleeve 11 will also be formed of nylon but will not be heat-treated so that it will have more resiliency or stretch. The sleeve will have an opening extending therethrough which will be of slightly less diameter than the diameter of the line or leader. The result is that when the sleeve is positioned on the line or leader, it will firmly grip such member.

In Figure 2, I have illustrated how the sleeve can be formed, it being understood that the sleeve is greatly enlarged in this figure. It can be formed by wrapping the strand of material around a wire indicated at 14 and tying the knots 18 in alternate loops on alternate sides of the wire. The wire is shown much larger in proportion to the strand material than it would actually be to show the knots, and the sleeve is shown shorter than it actually is. In tying the knots considerable stretching of the strand material occurs and the sleeve is, therefore, under tension and tends to contact. The two ends 18a of the strand material at the last completed end of the sleeve can be welded or fused together, as shown in Figure 2, by use of a formative acid which dissolves the nylon material sufficiently to cause the strand ends to adhere to each other.

Obviously, the line and the sleeve may be very small in diameter. For example, the line may be as small as from 0.009 inch to 0.011 inch while the opening in the sleeve may be as small as 0.07 inch to 0.010 inch, it being understood that the opening in the sleeve is always smaller than the diameter of the line on which it is to be mounted. With a sleeve and line of such small diameters, special means would be necessary for mounting the sleeve on the line. Therefore, I have provided a threading device which is illustrated in Figures 3 to 5 for mounting the sleeve on the line.

This threading device comprises a piece of wire which is the wire 14 on which the sleeve is formed. This wire is of slightly larger diameter than the line on which the sleeve is to be mounted. This wire 14 has a ball 15 fastened thereto at one end to serve as a fixed finger grip. It also has mounted thereon a ball 16 which is slidable thereon and which serves as a slidable finger grip. The end of the wire is looped at 17 and between this loop 17 and the slidable member 16 the stop sleeve 11 is positioned on the wire.

To transfer the sleeve 11 from the wire 14 of the treading device to the line 10, as shown in Figure 3, the end of the line 10 is first passed through the loop 17. Then, by gripping the member 15 with the fingers of one hand and gripping the slidable member 16 with the fingers of the other hand, the sleeve 11 is pushed tight against the line 10. The protruding end of the line 10 is then cut off so that there is only a slight protruding portion as shown in Figure 4. A further push on the sleeve 11 by means of the slidable member 16 will move the sleeve 11 from the line 14 onto the line 10 as shown in Figure 5. However, it is preferred to wet the stop sleeve and the end of the line before it is pushed onto the line in order to provide lubrication. The sleeve 11 may now be moved to any desired position on the line 10. It will grip the line because as it leaves the larger wire 14 it will tend to return from its stretched size to its normal size.

It will be apparent from the above description that I have provided a novel stop arrangement for a float which is mounted for axial movement on a fishing line so that the line can be used in casting. This stop is adjustable readily whenever it is desired to change the depth of fishing yet will limit the movement of the float as desired. The stop member is relatively small although slightly larger than the fishing line and can remain in position on the line when it is desired to fish without the float. I not only have provided a novel stop arrangement but also I have provided a novel device for positioning the stop member on the line.

Various other advantages will be apparent.

Having thus described my invention, what I claim is:

1. In combination with a monofilament fish line, a threading device for positioning a stop sleeve thereon in gripping relationship thereto, said threading device comprising a wire of slightly greater diameter than the line, said stop sleeve being formed of strand material wound under tension on the wire so that it will contract on the line when slipped from the wire onto the line, a loop in one end of the wire through which the end of the line may be passed, said sleeve being mounted on the wire adjacent the loop.

2. The method of applying a stop sleeve to a monofilament fish line comprising forming the sleeve on a wire of slightly greater diameter than the line from strand material by winding it thereon under tension, providing a loop in an end of the wire, inserting the end of the line in the loop, and then slipping the sleeve over the looped end of the wire onto the line to allow it to contact and grip the line.

References Cited in the file of this patent

UNITED STATES PATENTS

| | | |
|---|---|---|
| 943,506 | Wooton | Dec. 14, 1949 |
| 2,584,231 | Schmidt | Feb. 5, 1952 |
| 2,732,652 | Parks | Jan. 31, 1956 |